US010339452B2

(12) United States Patent
Romano et al.

(10) Patent No.: US 10,339,452 B2
(45) Date of Patent: Jul. 2, 2019

(54) AUTOMATED ONTOLOGY DEVELOPMENT

(71) Applicant: Verint Systems Ltd., Herzilya Pituach (IL)

(72) Inventors: Roni Romano, Even Yehuda (IL); Yair Horesh, Kfar-Saba (IL); Jeremie Dreyfuss, Tel Aviv (IL)

(73) Assignee: VERINT SYSTEMS LTD., Herzilya Pituach (IL)

( * ) Notice: Subject to any disclaimer, the term of this patent is extended or adjusted under 35 U.S.C. 154(b) by 744 days.

(21) Appl. No.: 14/173,435

(22) Filed: Feb. 5, 2014

(65) Prior Publication Data

US 2014/0222419 A1    Aug. 7, 2014

Related U.S. Application Data

(60) Provisional application No. 61/761,479, filed on Feb. 6, 2013, provisional application No. 61/884,577, filed on Sep. 30, 2013.

(51) Int. Cl.
| | | |
|---|---|---|
| *G06F 17/30* | (2006.01) | |
| *G06N 5/02* | (2006.01) | |
| *G06F 16/36* | (2019.01) | |

(52) U.S. Cl.
CPC ........... *G06N 5/022* (2013.01); *G06F 16/367* (2019.01)

(58) Field of Classification Search
None
See application file for complete search history.

(56) References Cited

U.S. PATENT DOCUMENTS

| | | | |
|---|---|---|---|
| 5,737,617 A | 4/1998 | Bernth et al. | |
| 6,076,088 A * | 6/2000 | Paik ................. | G06F 17/30707 |
| 6,434,557 B1 | 8/2002 | Egilsson et al. | |
| 6,718,296 B1 | 4/2004 | Reynolds et al. | |
| 7,113,958 B1 | 9/2006 | Lantrip et al. | |
| 8,190,628 B1 * | 5/2012 | Yang ................. | G06F 17/2775 |
| | | | 704/10 |
| 9,639,520 B2 | 5/2017 | Yishay | |
| 9,646,605 B2 * | 5/2017 | Biatov ................. | G10L 15/063 |
| 9,697,246 B1 * | 7/2017 | Romano ........... | G06F 17/30345 |
| 9,720,907 B2 * | 8/2017 | Bangalore ............... | G06F 17/28 |
| 9,760,546 B2 * | 9/2017 | Galle ....................... | G06F 17/22 |
| 2002/0032564 A1 | 3/2002 | Ehsani et al. | |
| 2002/0128821 A1 * | 9/2002 | Ehsani ................. | G10L 15/193 |
| | | | 704/10 |
| 2002/0188599 A1 * | 12/2002 | McGreevy ........ | G06F 17/30539 |

(Continued)

OTHER PUBLICATIONS

Chen, S.F., et al, "An Empirical Study of Smoothing Techniques for Language Modeling," Computer Speech and Language, vol. 13, 1998, 62 pages.

(Continued)

*Primary Examiner* — Michael N Opsasnick
(74) *Attorney, Agent, or Firm* — Meunier Carlin & Curfman LLC (57) ABSTRACT

Systems and methods of automated ontology development include a corpus of communication data. The corpus of communication data includes communication data from a plurality of interactions and is processed. A plurality of terms are extracted from the corpus. Each term of the plurality is a plurality of words that identify a single concept within the corpus. An ontology is automatedly generated from the extracted terms.

20 Claims, 4 Drawing Sheets

(56) References Cited

U.S. PATENT DOCUMENTS

| | | | |
|---|---|---|---|
| 2003/0028512 A1 | 2/2003 | Stensmo | |
| 2003/0126561 A1 | 7/2003 | Woehler et al. | |
| 2004/0078190 A1 | 4/2004 | Fass et al. | |
| 2006/0248049 A1 | 11/2006 | Cao et al. | |
| 2007/0016863 A1 | 1/2007 | Qu et al. | |
| 2008/0021700 A1* | 1/2008 | Moitra | G06F 17/30734 704/9 |
| 2008/0154578 A1* | 6/2008 | Xu | G10L 15/1815 704/4 |
| 2009/0043581 A1 | 2/2009 | Abbott et al. | |
| 2009/0099996 A1 | 4/2009 | Stefik | |
| 2009/0150139 A1 | 6/2009 | Jianfeng et al. | |
| 2009/0204609 A1 | 8/2009 | Labrou et al. | |
| 2009/0254877 A1 | 10/2009 | Kuriakose et al. | |
| 2009/0306963 A1 | 12/2009 | Prompt et al. | |
| 2010/0161604 A1* | 6/2010 | Mintz | G06F 17/30734 707/736 |
| 2010/0275179 A1* | 10/2010 | Mengusoglu | G06F 8/10 717/104 |
| 2011/0161368 A1 | 6/2011 | Ishikawa et al. | |
| 2011/0196670 A1* | 8/2011 | Dang | G06F 17/2785 704/9 |
| 2013/0018650 A1* | 1/2013 | Moore | G06F 17/2818 704/9 |
| 2013/0260358 A1 | 10/2013 | Lorge et al. | |
| 2014/0040275 A1 | 2/2014 | Dang et al. | |
| 2014/0075004 A1 | 3/2014 | Van Dusen et al. | |
| 2014/0297266 A1 | 10/2014 | Nielson et al. | |
| 2015/0066506 A1 | 3/2015 | Romano et al. | |

OTHER PUBLICATIONS

Coursey, K., et al., "Topic identification using Wikipedia graph centrality," Proceedings of the 2009 Annual Conference of the North American Chapter of the Association for Computational Linguistics, Human Language Technologies, Short Papers, 2009, pp. 117-120.

Král, P., et al., "Dialogue Act Recognition Approaches," Computing and Informatics, vol. 29, 2010, pp. 227-250.

Kumar, N., et al., "Automatic Keyphrase Extraction from Scientific Documents Using N-gram Filtration Technique," Proceedings of the $8^{th}$ ACM symposium on Document engineering, 2008, pp. 199-208.

Stolcke, A., et al., "Automatic Linguistic Segmentation of Conversational Speech," IEEE, vol. 2, 1996, pp. 1005-1008.

Zimmerman, M., et al., "Joint Segmentation and Classification of Dialog Acts in Multiparty Meetings," Acoustics, Speech and Signal Processing, 2006, pp. 581-584.

* cited by examiner

AUTOMATED ONTOLOGY DEVELOPMENT

CROSS-REFERENCE TO RELATED APPLICATIONS

The present application claims priority of U.S. Provisional Patent Application No. 61/761,479, filed on Feb. 6, 2013 and 61/884,577, filed on Sep. 30, 2013, the contents of which are hereby incorporated herein by reference in their entireties.

BACKGROUND

The present disclosure relates to the field of automated data processing. More specifically, the present disclosure is related to the automated development of an ontology from speech data.

Presently available ontological solutions are limiting both in terms of generality and specificity. Specifically, present ontological solutions are limited to broad generalizations regarding the content of the communication data to be analyzed, at best representing a particular domain or field of the communication data. On the other hand, present ontological solutions are limited in focus through a single channel of communication data. Therefore, a need exists for ontological solutions that are both broader and narrower in the sense that the ontological solution is broadly applicable to multiple channels of communication and that the ontology itself is tailored to the specific communication data received through these channels.

BRIEF DISCLOSURE

A method of automated ontology development includes processing a corpus of commination data. The corpus includes communication data from a plurality of interactions. A plurality of terms are extracted from the corpus. Each term is a plurality of words that identifies a single concept within the corpus. The ontology is automatedly generated from these extracted terms.

An additional embodiment of a method of automated ontology development includes processing a corpus of commination data. The corpus includes communication data from a plurality of interactions. The corpus is processed by zoning the communication data to segment the communication data into a plurality of meaning units. A plurality of terms are extracted from each of the plurality of meaning units. Each term of the plurality is a plurality of words that identify a single concept within the corpus. An ontology is automatedly generated. The ontology includes the extracted term.

An exemplary embodiment of a system for automated ontology development includes a communication data database populated with communication data. A processor is communicatively connected to the communication data database. The processor is communicatively connected to a computer readable medium. The computer readable medium is programmed with computer readable code that upon execution by the processor causes the processor to carry out a series of functions or operations. The processor processes a corpus of communication data received from the communication data database. The processor extracts a plurality of terms from the corpus. Each term of the plurality is a plurality of words that identify a single concept within the corpus. The processor automatedly generates an ontology from the extracted plurality of terms. The processor stores the automatedly generated ontology in an ontology database.

DETAILED DISCLOSURE

An ontology is a formal representation of a set of concepts, and the relationships between those concepts in a defined domain. The ontology models the specific meanings of terms as they apply to that domain. Communication data may exist in the form of an audio recording, streaming audio, a transcription of spoken content, or any written correspondence or communication. In the context of a customer service interaction, the communication data may be a transcript between a customer service agent or interactive voice response (IVR) recording with a customer/caller. The interaction may be via phone, via, email, via internet chat, via text messaging, etc. An ontology can be developed and applied across all types of communication data, for example, all types of customer interactions (which may include interactions in multiple languages) to develop a holistic tool for processing and interpreting such data.

In the generation of an ontology to interpret this data, repeating patterns are identified and ranked based upon statistical significances and then clustered into terms and term relationships. The disclosed solution uses machine learning-based methods to improve the knowledge extraction process in a specific domain or business environment. By formulizing a specific company's internal knowledge and terminology, the ontology programming accounts for linguistic meaning to surface relevant and important content for analysis. For example, the disclosed ontology programming adapts to the language used in a specific domain, including linguistic patterns and properties, such as word order, relationships between terms, and syntactical variations. Based on the self-training mechanism developed by the inventors, the ontology programming automatically trains itself to understand the business environment by processing and analyzing a defined corpus of communication data.

The disclosed ontology programming, once built and refined for a specific business application, is applied to process communication data to provide valuable analytics for a variety of business needs. For example, the ontology programming can then be utilized to detect and surface meaningful items in a data set, such as a database of recorded employee-customer interactions, and can mine the data set to extract and analyze business data based on an enhanced formulization of a company's internal knowledge and terminology.

In the context of customer service interactions, spoken content may exist as various forms of data, including, but not limited to audio recording, streaming audio and transcribed textual transcript. While the present disclosure will exemplarily feature the analysis of textual transcripts, it is to be understood that in alternative embodiments audio recording or streaming audio may be used or analyzed.

Audio data from a customer interaction between a customer service agent/IVR and a customer/caller can be automatedly transcribed into a textual file through speech recognition techniques. However, challenges exist in automatedly interpreting the content and sentiments conveyed in the customer service interaction. An ontology, which generally refers to a collection of entities and their relations, is one way in which an automated interpretation of a customer service interaction can be developed, organized, and presented as disclosed herein.

An ontology as disclosed is a formal representation of a set of concepts and the relationships between these concepts. In general, an ontology will focus on a specific domain or general context within which the individualized terms or classes as described herein are interpreted. As a non-limiting example, the ontology described herein are with respect to customer service interactions. The ontology may be defined to more specific domains, including but not limited to, financial services, consumer products, subscription services, or some other service interactions.

Generally, an ontology as disclosed herein include terms which are individual words or short phrases that represent the basic units or concepts in the customer service interaction. Non-limiting examples of terms, as used herein, include "device", "iPhone", "iPhone four", "invoice", "I", "she", "bill", "cancel", "upgrade", "activate", "broken", or "cell phone", "customer care", or "credit card." However, these are not intended to be limiting in any manner and are merely exemplary of basic units or concepts that may be found in a customer service interaction.

Strong term candidates contain words or word sets that are compact and, in the instance of word sets, the frequency of finding the word set together is very high. An example of a term containing a word set is "credit card number," as those words very often appear together and refer to a particular, defined object. In addition, good terms often contain words that make more conceptual sense when they are together, as opposed to being on their own. For example, the term "Nova Scotia" is comprised of words that make sense when found together, and would likely not appear or make sense separately.

The frequency that the words of a particular word set, or term, appear together may be referred to as the "stickiness" of the term. A "sticky" term is one whose words appear frequently appear together in the corpus. The higher the stickiness ranking, the stronger the term, as it means that the term has meaning in the corpus as a concept. Salient terms are those that stand out or have a higher score relative to similar or neighboring terms. Non-salient terms are those that appear many times in many different contexts, and the score of non-salient terms is lowered. The logic is that salient terms are likely to be meaningful as a concept, whereas non-salient terms are not likely to express a particular concept. For example, the score of the term "account number" would be higher than the score of the term "the account number" because the word "the" appears in many different contexts and also by itself. Therefore, the word "the" does not add any significant meaning when joined with the term "account number."

Classes are broader concepts that encapsulate or classify a set of terms. Classes describe semantic concepts to which classified terms are related, it is also to be understood that classes may also classify or encapsulate a set of subclasses in which the terms are classified. Non-limiting examples of classes, may be include "objects", "actions", "modifiers", "documents", "service", "customers", "locations". However, these are not intended to be limiting on the types of classes, particularly the types of classes that may appear in an ontology directed to a specific or specialized domain.

Figure 2:
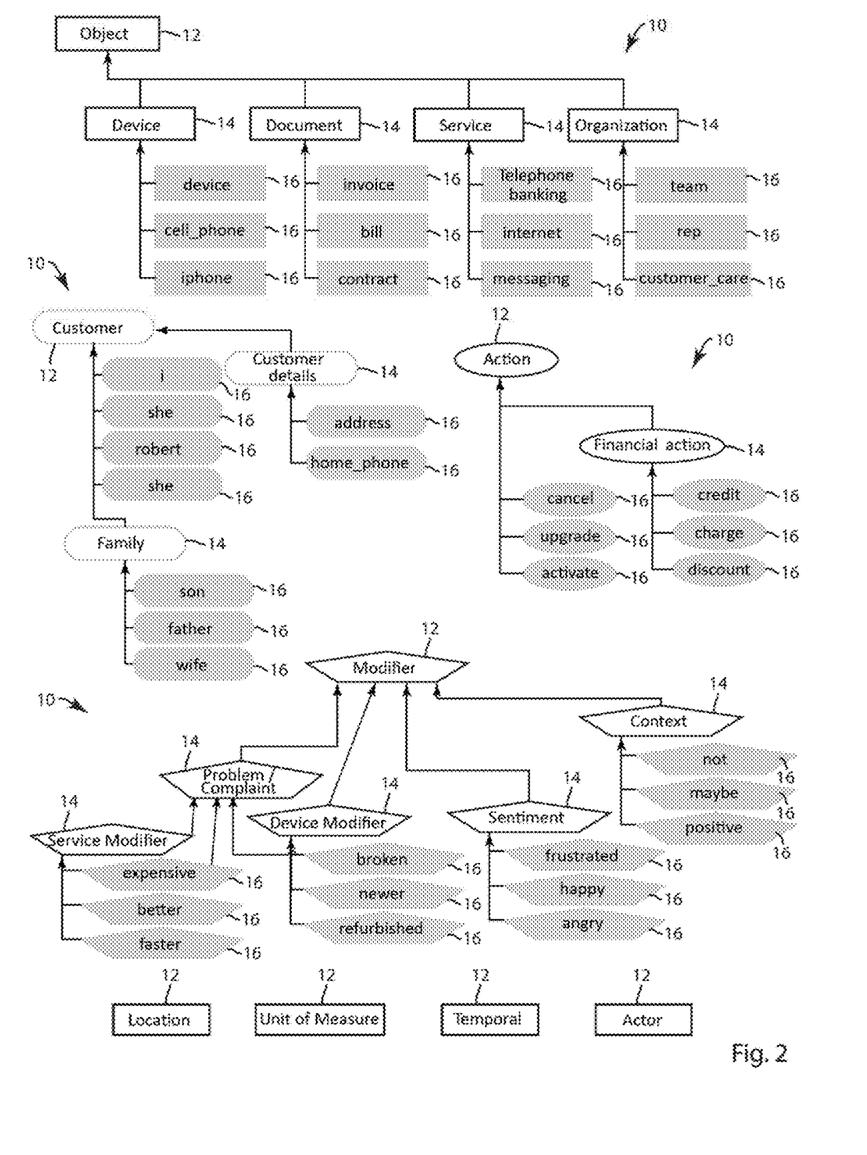
FIG. 2 depicts examples of hierarchical presentations of automatedly developed ontologies.

The classes, subclasses, and terms are connected by a plurality of relations which are defined binary directed relationships between terms and classes/subclasses or subclasses to classes. In a non-limiting example, the term "pay" is defined under the class "action" and the term "bill" is defined in the class "documents". Still further binary directed relationships can be defined between these class/term pairs. The action/pay pair is related to the document/bill pair in that the payment action requires an underlying document, which may be a bill. In another non-limiting example, the term "broken" is defined in the class "problems" and the term "iPhone" is defined in the class "device". The problem/broken pair can also have a directed relationship to the "devices" class in which the "iPhone" term is a specific example as represented by the devices/iPhone pair. FIG. 2 depicts exemplary, non-limiting embodiments of ontology 10, including classes 12, subclasses 14, and terms 16. The arrows between the terms/classes/subclasses represent some relations that may exist in the ontology.

Figure 1:
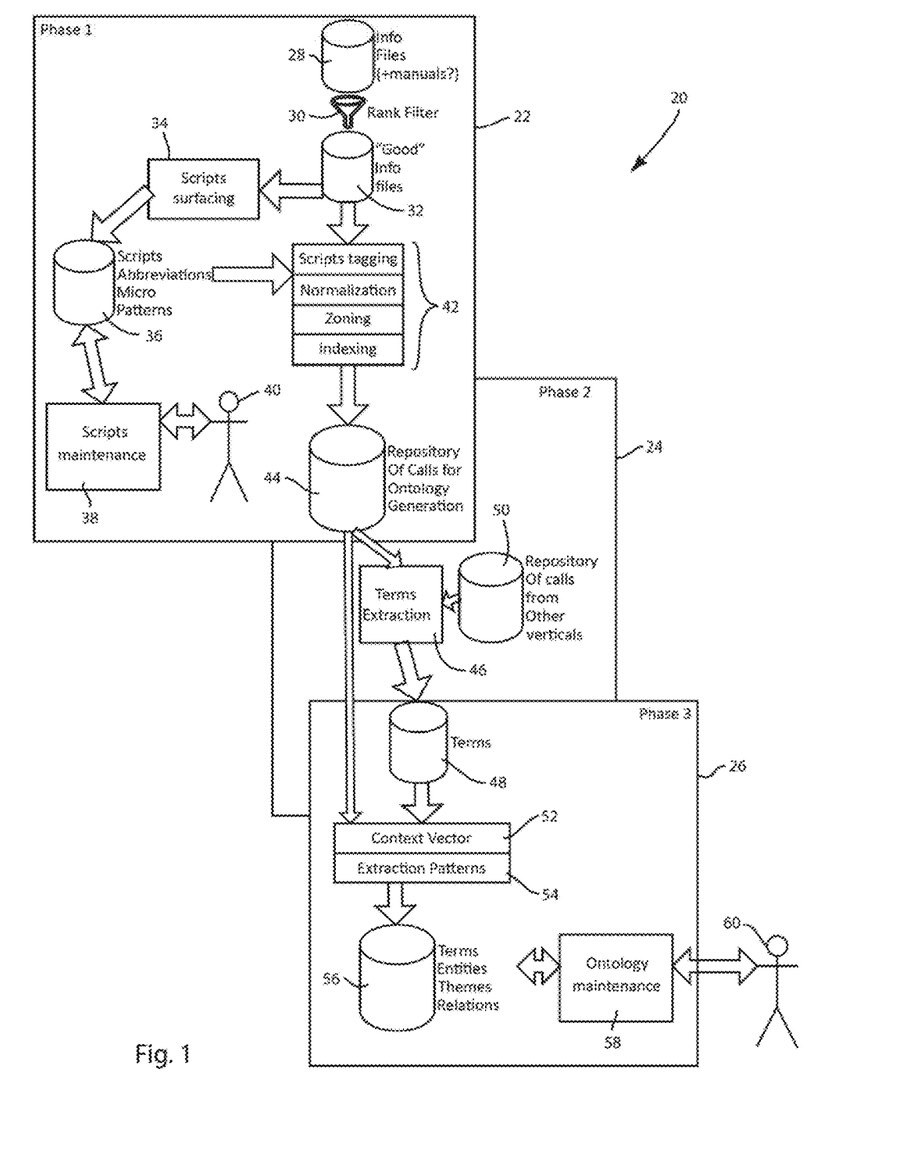
FIG. 1 is a schematic diagram of an embodiment of a process for ontology development.

FIG. 1 is a schematic diagram of an exemplary process to develop an ontology for customer service interactions. The process 20 can be divided into three exemplary phases, namely the corpus processing 22, the term identification 24 and ontology generation 26.

The corpus processing at 22 begins with a data base of raw data which may include, customer service interactions such as transcriptions of customer service interactions and other information files such as customer service agent scripts, service manuals, product manuals, or the like. During the transcription process, the transcription server uses a language model to transcribe the text in an interaction. The text is divided into timeslots (measured in milliseconds) to segment the utterances (consecutive stream of words from the same speaker). For each time slot, the transcription engine provides one or more suggestions for each transcribed word, and assigns a transcription score for each suggestion. The transcription score may be derived based on two guiding principles. First, the transcription engine's confidence in the word is determined b the likelihood of its neighboring words (words that come before and after the word). This is calculated by a series of probability tables. Second, an engine's confidence in the word is determined by how close the word comes to the original vocal sound (or the word's source). If the engine surfaces more than one likely candidate for a word, the engine produces a list of candidate words and sorts them based on their transcription score—e.g. from highest to lowest.

The corpus provided at 28 is filtered by a rank filter at 30 which may be used to create a subset of the corpus stored at 32 which has been identified through the rank filter at 30 to be related or instructive to the domain of the ontology that is to be developed, which in the present example is customer service interactions. In a non-limiting embodiment, the rank filter includes a statistical analysis of the terms that appear in the data stored at 28 and the filter selects those data files that include specific threshold of identified related terms or statistically significant terms.

The filtered data files at 32 are used to identify scripts at 34. Scripts are sequences of a predefined number of words that commonly or repeatedly occur in the filtered data. In a non-limiting example, scripts are identified at 34 by dividing the filtered data to utterances which are consecutive sequences of words spoken by one speaker in a conversation without interference from another speaker or any event. Utterances may exemplarily result from a customer service agent or from the use of IVR. Scripts can be identified by sequences of text that follow a predetermined script identification rule. A non-limiting example of a rule to identify an agent script can exemplarily be a sequence of more than x (where x is a parameter) number of words occurring more than y (where y is a parameter) times per million utterances in the filtered files where some range of tolerance for missing or additional words in the sequence is provided. A non-limiting example of a rule to identify an IVR script may be a sequence of more than x (where x is a parameter) words that is characterized by the constant distribution of word length and distances between particular words in the sequence.

In addition to the identification of full scripts from the filtered data, other templates may be identified. These templates may be the identification of abbreviations and the associated meaning of such abbreviations, or the identification of micropatterns in the filtered data. Micropatterns are similar to scripts, but are typically shorter and may occur in the utterances of either an agent or a customer where the micropattern expresses sub-sequences of words that indicate the existence of other information in close proximity to a micropattern in the customer service interaction. Non-limiting examples of micropatterns may be sequences of numbers, such as may indicate a date, a price, a telephone number, or a credit card number. Non-limiting examples of these may include that a telephone number is 10 numerical digits typically expressed in a three-three-four pattern while a credit card number is a 16 digit number that is often expressed in a four-four-four-four number pattern.

Identified scripts, abbreviations, and/or micropatterns may all be stored at 36 for use in the processes as described herein. The scripts, abbreviations and/or micropatterns stored at 36 also come from other data processing sources, and script maintenance processes 38 where the information stored at 36 is updated to reflect emerging issues, topics, or trends. The script maintenance at 38 may be an automated, semi-automated, or manual process that may involve the review and/or input from a user 40 to evaluate the data stored at 36.

The scripts, abbreviations, and/or micropatterns stored at 36 are also used to process at 42 each of the files from the filtered data 32. The processing at 42 may include, but is not limited to script tagging, normalization, zoning and/or indexing, Each of these techniques represent manners in which a data file can be preprocessed to provide additional information regarding the data files for use in facilitating further aspects of the process as described herein. As a result of the processing at 42, features in the data files such as utterances, meaning units, call segments, categories, and dialog acts may be identified within the data files and these processed data files are stored at 44.

In examples as disclosed herein, utterances are consecutive sequences of words spoken by one speaker in a conversation without interference by another speaker or another event. Meaning units divide utterances into a basic segment of meaning or the equivalent of a sentence, when narrated text is compared to written text. A meaning unit may be a sequence of words spoken by one speaker in a conversation without interference. In some embodiments, the meaning unit may include some level of speaker interference, e.g. very short acknowledgement statements by the other speaker. All terms in the meaning unit are linked within the boundaries of the meaning unit. A call segment is a set of utterances within a call, usually consecutive utterances, that are related to a specific topic. Non-limiting examples of call segments may include, call beginning, customer detail verification, call reason, problem description, problem resolution, and call finalization. A dialog act is related to a call segment in that the dialog act indicates some intention of the speaker or denotes a function or purpose of an utterance or meeting unit within the customer service interaction. Non-limiting examples of dialog acts may include an identification whether a utterance/meaning unit is a statement, question, greeting, or such. In some embodiments, a category or a user defined labeled predicate is assigned to the data file exemplarily by the customer service agent to identify a domain of the customer service interaction. In an alternative embodiment, the category may be determined through the application of rules that are expressed as a query language using logical operators on variables (text) extracted from the call.

After the corpus processing 22 has been completed, the process continues with term identification at 24. In the term identification at 24, the individual terms, such as described above, are identified and extracted at 46 from the customer service interactions stored at 44. As noted above, the terms are basic units of the call data which represent a single concept. The identified terms are stored at 48. It is to be noted that in the term identification at 24, other sources 50 of customer service interactions, such as, but not limited to, other calls, or interactions from other such as email, web chat, or social media, may be introduced to the process at this time for ontology development.

The final phase of the process is ontology generation at 26. In ontology generation, context vectors 52 and extraction patterns 54 are developed and applied to both the extracted terms 48 and to the processed customer service interactions at 44. Context vectors 52 and extraction patterns 54 will be described in further detail herein.

Context vectors are rules or algorithms that are applied to the extracted terms 48 and the customer service interactions 44 in order to identify or group similar or related terms which can exemplarily be identified or grouped as synonyms, equivalents, or as classes in the ontology. Context vectors can also be applied in order to disambiguate a term meaning according to the local context in which the term is used in the customer service interaction. Context vectors may be created as part of a pro-processing stage, exemplarily, during the corpus processing 22 or used in the ontology generator 26. As inputs, the context vectors receive statistics of the extracted terms in the customer service interaction and receive the identified meaning units from the customer service interactions.

In a non-limiting embodiment, a context vector is created by first computing how many times each term appears in the extracted terms 48 as well as in the customer interaction data 44. Next, the number of times each pair of terms appear adjacent to a term within the same meaning unit is computed. For each term, a context vector or a list that predicts terms that will appear to the left and to the right of the term is created. In embodiments, each terms will have two context vectors associated with that term (a left or preceding vector and a right or following vector). In order to create the two vectors, a score is calculated that is representative of the likelihood that a specific term will appear (exemplarily to the left) of the term being investigated. In one embodiment, the score is calculated as $P(T-(i)) \div \text{average\_distance}(T, t(i))$. The potential terms are sorted based upon their calculated predictive score and a predetermined number of terms taken in descending order by predictive score are selected to be a context vector for that term.

In a non-limiting example, the size of a context vector may have a maximum of 30 terms. When an investigation is made for term pairs that appear adjacent to the term within a meaning unit, the term pairs must appear within a predetermined distance, e.g. 10 words. The distance is calculated between the nearest points between the two terms. In application of the context vector, a score may be created by first disregarding term pairs that do not occur a predetermined minimum threshold of occurrences, e.g. three occurrences. Next, instances of term pairs in which the candidate term does not have a predetermined minimum number of appearances, e.g. 10 appearances, are disregarded. Instances of term pairs with the ratio between the number of instances of the candidate pair and the total number of instances for that term is above a predetermined threshold (e.g. 10,000 or more) are also disregarded. The context vector score is calculated from the remaining identified term pairs.

In the extraction of patterns at 54, a pattern can be defined as a syntactic pattern within a sentence or meaning unit boundary. The pattern may be expressed as a regular expression, generalizing common syntactic structure found within sentences or meaning units of the customer service interactions. The syntactic patterns may generally identify relations between identified classes of terms as the terms appear in relation to one another, and to common intervening phrases, scripts, or micropatterns. A non-limiting example of a pattern may be searching for the following sentence or meaning unit within a customer service interaction:

[Customer] would like to [action] the [object] . . .

If such a pattern is identified in an utterance, sentence, or meaning unit of a customer service interaction, then the terms that actually occur in the meaning unit can be identified as belonging to or being related to the identified classes in the pattern.

The identified terms, entities, relations, and themes are stored at 56 as an ontology to be used in the automated interpretation of customer service interactions. As noted with scripts above, the process of ontology maintenance 58 may include the presentation of the developed ontologies to a user for manual user review, input, modification or other analysis in an effort to refine, or maintain the automatically generated ontologies at 56. In the maintenance 58, the user is presented with the ontology in whole or in part in a graphical representation. In one embodiment, the ontology may be presented in whole or in part in a hierarchical view. In such a view, the terms may be clustered based upon similarity representing synonyms or other similar words. The user 60 may be presented with a similarity threshold that may be adjustable to refine the created ontology. In an alternative embodiment, the ontology is presented in a relational view. In a relational view, the patterns in the text are displayed in a columnar format with instances or examples of each pattern populating the column. Graphical links may be displayed between the instances in order to show the strength of the relationships between the words. In some embodiments, the ontology is generated by identifying repeating patterns and raking the repeating textual patterns found in the customer service interactions based on the statistical significance of those patterns across all of the customer service interactions. These identified patterns and rankings are presented to the user 60, exemplarily in one of the manners as described above and such ontologies are viewed by the user and the user is prompted for feedback in order to improve the generated ontologies.

As mentioned above, the ontology, once generated, may be provided in the form of an output of clustered terms and term relationships. This output of cluster terms and term relationships may be used in a text analyzer in order to interpret textual transcripts of customer service interactions. The interpretation of these customer service interactions can be used to identify content or meaning of a particular customer service interactions, or may be used across many customer service interactions in order to identify topics, trends, or emerging issues across a large number of similar service interactions.

Figure 3:
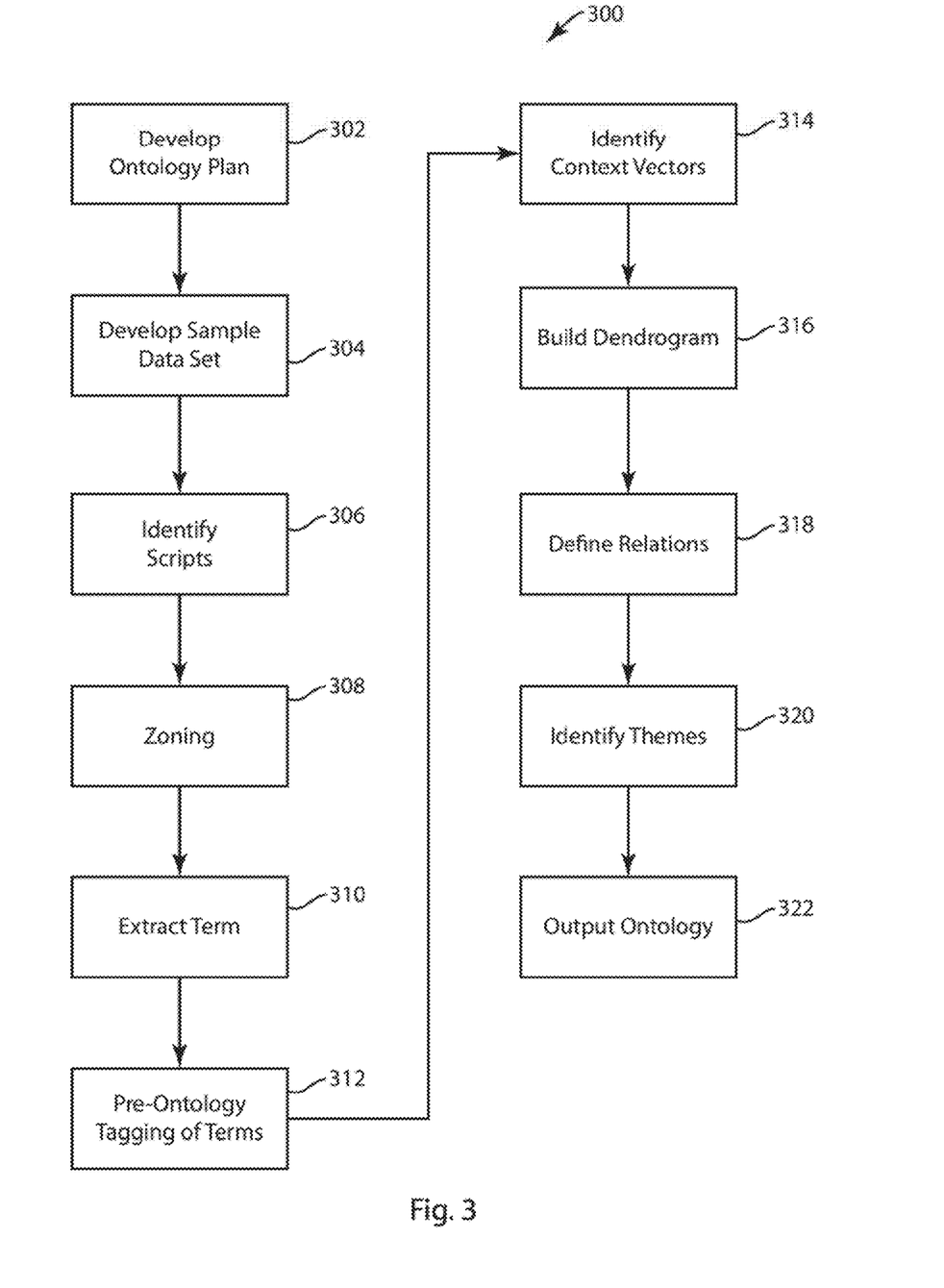
FIG. 3 is a flow chart of an exemplary embodiment of a method of automated ontology development.

FIG. 3 is a flow chart of an exemplary embodiment of a method 300 of automated ontology development. As exemplified in FIG. 3, developing an ontology may begin with the prerequisite steps of developing an ontology plan 302 and developing a sample data set 304. Developing an ontology plan 302 involves assessing a customer's business needs to develop a comprehensive plan for the ontological structure that can process the customer's data to provide the desired result. For example, developing an ontology plan 302 may include a number of ontologies that are required for a specific customer. For example, customers may decide they need multiple ontologies to handle specialized types of data that can be categorized into different business domains.

Developing the sample data set 304 involves accumulating a good and varied range of communication data for each planned ontology. In an embodiment, the data accumulated includes data that originates from different time periods, for example, within about a month previous to the date of implementing the method. The data is validated and gathered from a defined source or sources. The developed sample data set 304 may include communication data from a single platform, such as transcriptions of customer service phone calls, or it may include data from multiple platforms, such as customer service calls, emails, web chats, text messages, web page comments, social media such as Facebook or Twitter interactions, customer surveys, etc. In still other embodiments, the sample data set includes other types of communication data from business documents such as, but not limited to, white papers, user manuals, service manuals, or catalogs. Embodiments of the method 300 may be held for execution until a certain, predefined amount of data is gathered for the sample data sets. Further, in embodiments all types of data in the sample data set at 304 in which the resultant ontology will be applied are useful. In one embodiment, a configured scheduler may monitor the data gathering process and count the number of records or amount of data added. When the number of records, or amount of data in the sample data set at 304 reaches that predetermined amount, the scheduler may execute the rest of the method 300.

Once the sample data set is fully developed at 304, the method 300 continues by identifying scripts 306 within the sample data set from 304. Scripts are lengthy, repeated patterns that appear in the sample data set. Due to their length and historical frequency, scripts are highly likely to be accurately identified and to have emanated from the same speaker. For example, a standard phrase spoken by a customer service agent, such as "Hello, how can I help you?" may comprise a script. Scripts are therefore relatively easily identified initial structural markers in analysis of the communication data in the sample data set.

Following the identification of scripts at 306, next, zoning at 308 segments conversations within a defined corpus, or the sample data set, into meaning units. Meaning units are sequences of words that express an idea. In the context of spoken or informal communications, the meaning unit may be the equivalent in meaning or function of a sentence in written communication. A non-limiting example of a meaning unit in a customer service context would be the customer statement "I would like to buy a phone."

After the zoning 308 has been completed, at 310 terms are extracted. Term extraction at 310 is a process that reviews all meaning units and extracts the terms that are meaningful in the sample data set. A term is a short list of words (e.g. between 1 and 5 words) that has a precise meaning, or a meaning that stands out in its context. For example, "credit card" and "your account number" could both be appropriate terms.

At 312 pre-ontology tagging of terms is performed to tag all of the terms extracted at 210 in the sample data set in a non-overlapping way. For example, according to the explanation provided later herein, a term cannot span two meaning units and two terms can never overlap each other. Similarly, longer terms are generally preferred over shorter ones. For example, the term "my phone number" is tagged as one term, rather than two (i.e. "my phone" and "my phone number"). Also the term embodying three words is selected over the term with two as the term with more words conveys more contextual meaning.

Next, context vectors are identified in the sample data set at 314. Context vectors are linkages between defined terms in the sample data set, and the words that appear before or after each term. The process begins by creating a linkage between the defined terms in the corpus, and the words that often appear before and after each term (based on a statistical calculation). The logic is to capture a list of terms that are predictive to the occurrence of a main term in the corpus. For example, the term "account" could be preceded by any of several terms, such as "have an," "to your," "a prepaid," "cancel my," or "my husband's." Likewise, the term "account" could be followed by any number of terms, such as "holder's", "receivable", or "been canceled." These so-called left and right context vectors contain the predictive words for a main term, also referred to as a pivot term. Identifying context vectors at 314 forms the basis for the next step, building dendrograms 316, in which terms are hierarchically clustered. A dendrogram, for example, may center around the term "purchase." The left context vector (preceding term) may be "want to", "need to", etc. While the right context vector (following term) may be "an i-phone", "the service", "high-speed internet."

After the dendrogram is built at 316, relations are defined within at 318 the sample data set. The defined relations from 318 are linkages or relationships between the extracted terms in the corpus. For example, "cancel>account," "speak with>supervisor," and "buy>new iPhone" are exemplary relations that may be defined at 318. In embodiments, a concise number of strong, meaningful relations are defined according to certain pre-determined policies or rules. Those strong relations are given a higher score, and thus are given preference over other, lower-scoring relations. For example, relations may be defined based on their compliance with the following rules. First, the average transcription score of the terms in the relation should be relatively high (transcription score is described in more detail hereinbelow). Second, the number of occurrences of the relation within an interaction should be high. Third, a strong relation is one that complies with the words in close proximity to it. The following example is illustrative.

1

2

In the above example, the relation "haven't received" in #1 is a stronger relation than "have received" in #2 because it makes more sense within the context of the words in close proximity thereto (haven't received . . . yet, as opposed to have received . . . yet). Fourth, a relation is stronger if the distance between the terms is relatively small. For example, in the phrase "I want to cancel my account," the relation between cancel>account is stronger than the relation between want>account. Fifth, a strong relation has relatively lengthy terms—i.e. the total number of words in a relation is high. This is because a relation with a higher number of words is likely to convey a more precise meaning and exact context. Sixth, and finally, strong relations are those whose terms appear in the interaction more often within a particular corpus.

The algorithm evaluates all possible relations, orders them by rank and defines any relation that does not contain one or more conflicts. For example, relations are not allowed to cross over one another.

In the above example, the relation want>change and change>phone are valid relations. Even though they share the term "change", the relations themselves do not cross over each other in the meaning unit. Likewise, the terms in the relations want>different model and change>phone do not cross over each other in the meaning unit, and thus are also valid relations. In the following example, however, the relations want>phone and change>model do cross over each other in the same meaning unit. Therefore, this goes against the relations policy and they are not defined as relations. The example below demonstrates a violation of this policy.

In fact, the relation want>phone does not make sense in this context, as the meaning of the sentence is about "changing" the phone. Likewise, change>model is not a strong relation, as it is unclear what "model" refers to without reading the meaning unit.

Similarly, a term instance in the same meaning unit cannot be assigned to multiple, different entities at the same time. In some cases, the same term in different meaning units, may be assigned to more than one entity—for example, phone can be assigned to two entities, depending on the context in the meaning unit (e.g. the word "phone" can be a noun or a verb: I have a "phone" vs. can I "phone" you). However, if the same term in the same meaning unit is defined and assigned to more than one entity, a disambiguation process resolves the conflict. For example, the algorithm prevents the term "phone" in the same meaning unit to be assigned to a device and an action entity simultaneously.

Likewise, a word cannot be assigned to more than one term. For example, the word "phone" in the example below cannot be assigned to more than one term.

In the above example, there are two potential terms: "my phone" and "my phone number". However, because the words in these terms overlap in the text, they cannot be defined as two separate terms. In this case, the term that is defined is "my phone number" because it is longer in length than "my phone."

Based upon the relations defined at 318, themes in the sample data set are identified at 320. Themes are groups or categories of relations that are similar in meaning. Themes 309 allow users to easily and efficiently understand the characteristics of interactions throughout the sample data set. For example, the theme "got an email" might correspond to several relations, including "got the email," "got confirmation," "received an email," "received an email confirmation," etc.

After the themes are identified at 320, the method 300 is completed by outputting the automatically developed ontology at 322. In an example, the ontology created by the method 300 may then be provided to an ontology maintenance module 58 (FIG. 1) wherein it would undergo further review and/or refinement.

Figure 4:
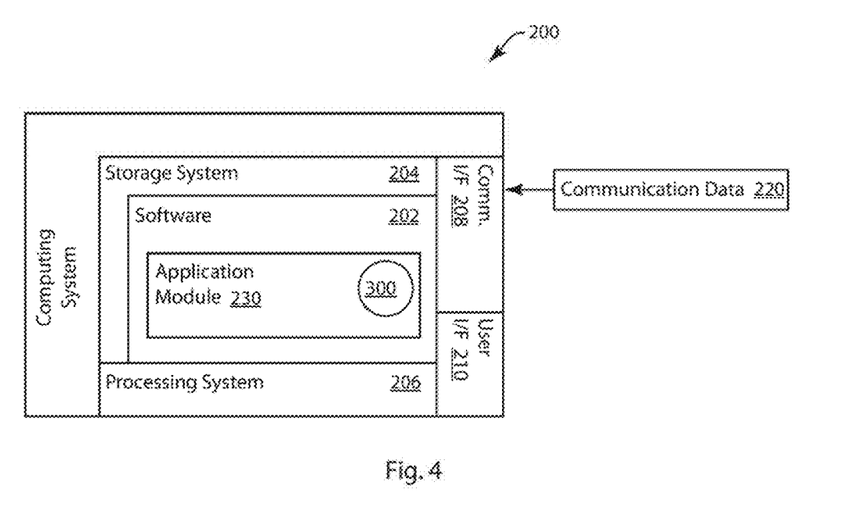
FIG. 4 is a system diagram of an exemplary embodiment of a system for automated ontology development.

FIG. 4 is a system diagram of an exemplary embodiment of a system 200 for automated ontology development. The system 200 is generally a computing system that includes a processing system 206, storage system 204, software 202, communication interface 208 and a user interface 210. The processing system 206 loads and executes software 202 from the storage system 204, including a software module 230. When executed by the computing system 200, software module 230 directs the processing system 206 to operate as described in herein in further detail in accordance with the method 300, and FIGS. 1 and 3.

Although the computing system 200 as depicted in FIG. 4 includes one software module in the present example, it should be understood that one or more modules could provide the same operation. Similarly, while description as provided herein refers to a computing system 200 and a processing system 206, it is to be recognized that implementations of such systems can be performed using one or more processors, which may be communicatively connected, and such implementations are considered to be within the scope of the description.

The processing system 206 can include a microprocessor and other circuitry that retrieves and executes software 202 from storage system 204. Processing system 206 can be implemented within a single processing device but can also be distributed across multiple processing devices or sub-systems that cooperate in executing program instructions. Examples of processing system 205 include general purpose central processing units, applications specific processors, and logic devices, as well as any other type of processing device, combinations of processing devices, or variations thereof.

The storage system 204 can include any storage media readable by processing system 206, and capable of storing software 202. The storage system 204 can include volatile and non-volatile, removable and non-removable media implemented in any method or technology for storage of information, such as computer readable instructions, data structures, program modules, or other data. Storage system 204 can be implemented as a single storage device but may also be implemented across multiple storage devices or sub-systems. Storage system 204 can further include additional elements, such a controller capable, of communicating with the processing system 206.

Examples of storage media include random access memory, read only memory, magnetic discs, optical discs, flash memory, virtual memory, and non-virtual memory, magnetic sets, magnetic tape, magnetic disc storage or other magnetic storage devices, or any other medium which can be used to store the desired information and that may be accessed by an instruction execution system, as well as any combination or variation thereof, or any other type of storage medium. In some implementations, the storage media can be a non-transitory storage media. In some implementations, at least a portion of the storage media may be transitory.

User interface 210 can include a mouse, a keyboard, a voice input device, a touch input device for receiving a gesture from a user, a motion input device for detecting non-touch gestures and other motions by a user, and other comparable input devices and associated processing elements capable of receiving user input from a user. In embodiments, the user interface 210 operates to present and/or to receive information to/from a user of the computing system. Output devices such as a video display or graphical display can display an interface further associated with embodiments of the system and method as disclosed herein. Speakers, printers, haptic devices and other types of output devices may also be included in the user interface 210.

As described in further detail herein, the computing system 200 receives communication data 220 at the communication interface 208. In embodiments, the communication interface 208 operates to send and/or receive data from other devices to which the computing system 200 is communicatively connected. In an embodiment, the communication data is audio data of an interpersonal communication which may exemplarily be between two speakers. In embodiments the audio data may be any of a variety of other audio records, including recorded or streaming audio data of multiple speakers, a single speaker, or an automated or recorded auditory message. In an embodiment, the communication data is a transcription of interpersonal communication. The transcription may be generated by transcribing audio data. In an embodiment, the transcription is exemplarily achieved using a large vocabulary continuous speech recognition (LVCSR) or other transcription technique. It is understood that any audio data may also undergo various forms of pre-processing prior to LVCSR transcription. Such preprocessing may include segmentation, exemplarily with a voice activity detector (VAD) in order to segment the audio data into a series of utterances, which are segments of audio data that are likely to be speech separated by segments of audio data that are likely to be non-speech segments. In embodiments, the communication data further includes any of a variety of types of data as disclosed herein which may be incorporated into the sample data set. Examples of such communication data 220 may include textual communications such as email, web chat, social media, white papers, surveys, user manuals, service manuals, and catalogs, although other types of communication data is disclosed herein and will also be recognized based upon these examples.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology may be required for a novel implementation.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method of automated ontology development via a computer system for processing communication data, wherein the ontology is a structural representation of language elements and the relationships between those language elements within a domain stored in memory of the computer system, the method comprising:
    processing a corpus of communication data by the computer system, the corpus comprising communication data from a plurality of interactions from multiple platforms;
    extracting a plurality of terms from the corpus by the computer system, wherein each term of the plurality is a plurality of words that identify a single concept within the corpus;
    automatedly generating an ontology by the computer system from the extracted terms by at least creating two context vectors for each of the plurality of terms and comparing the context vectors for each of the plurality of terms to one another to categorize the terms into a plurality of relations, wherein a first of the two context vectors of a given term is a first list of terms that predicts terms that will appear to the left of the given term, wherein a second of the two context vectors is a second list of terms that predicts terms that will appear to the right of the given term, wherein each of the context vectors includes up to a predetermined number of potential terms in the first or second list of terms taken in descending order based on a calculated score predictive of the likelihood that a specific term will appear adjacent to a given one of the plurality of terms within the meaning units; and
    storing the automatedly generated ontology in an ontology database in the memory of the computer system.

2. The method of claim 1, wherein processing the corpus further comprises:
    receiving raw communication data; and
    applying a rank filter to select a portion of the raw communication data as the corpus of communication data.

3. The method of claim 2, wherein the raw communication data comprises transcriptions of interactions, agent scripts, service manuals, and product manuals.

4. The method of claim 1, wherein processing the corpus further comprises:
    identifying scripts within the corpus, wherein scripts are recurring patterns of three or more words.

5. The method of claim 4, wherein processing the corpus further comprises:
    Zoning the communication data to segment the communication data into meaning units.

6. The method of claim 5, wherein the plurality of terms are extracted from the corpus on a meaning unit-by-meaning unit basis.

7. The method of claim 1, wherein the plurality of interactions are customer service interactions and the ontology is tailored for use in analyzing customer service interactions.

8. The method of claim 1, wherein the ontology comprises the plurality of terms, the plurality of relations, and a plurality of themes identified from the corpus.

9. The method of claim 1, wherein automatedly generating the ontology further comprises:
    comparing the plurality of relations to one another to categorize the relations into a plurality of themes.

10. A method of automated ontology development via a computer system for processing communication data, wherein the ontology is a structural representation of language elements and the relationships between those language elements within a domain stored in memory of the computer system, the method comprising:
    processing a corpus of communication data by the computer system, the corpus comprising communication data from a plurality of interactions from multiple platforms, by zoning the communication data to segment the communication data into a plurality of meaning units;
    extracting a plurality of terms from each of the plurality of meaning units by the computer system, wherein each term of the plurality is a plurality of words that identify a single concept within the corpus, wherein words in a given one of the meaning units are assigned to only one term;
    automatedly generating an ontology by the computer system that comprises the extracted terms by at least creating two context vectors for each of the plurality of terms and comparing the context vectors for each of the plurality of terms to one another to categorize the terms into a plurality of relations, wherein a first of the two context vectors of a given term is a first list of terms that predicts terms that will appear to the left of the given term, wherein a second of the two context vectors is a second list of terms that predicts terms that will appear to the right of the given term, wherein each of the context vectors includes up to a predetermined number of potential terms in the first or second list of terms taken in descending order based on a calculated score predictive of the likelihood that a specific term will appear adjacent to a given one of the plurality of terms within the meaning units; and storing the automatedly generated ontology in an ontology database.

11. The method of claim 10, wherein processing the corpus further comprises:

receiving raw communication data; and applying a rank filter to select a portion of the raw communication data as the corpus of communication data.

12. The method of claim 10, wherein automatedly generating the ontology further comprises:

comparing the plurality of relations to one another to categorize the relations into a plurality of themes.

13. The method of claim 12, wherein the ontology further comprises the plurality of relations and the plurality of themes.

14. A system for automated ontology development, wherein the ontology is a structural representation of language elements and the relationships between those language elements within a domain stored in memory, the system comprising:

a communication data database populated with communication data from interactions from multiple platforms;

a processor communicatively connected to the database of communication data and communicatively connected to a computer readable medium programmed with computer readable code that upon execution by the processor causes the processor to:

process a corpus of communication data received from the database through application of a rank filter to select the communication data from raw communication data, wherein the rank filter selects data files from the raw communication data that include a threshold of identified related terms to the domain of the ontology that is to be developed;

zone the communication data to segment the communication data into a plurality of meaning units;

extract a plurality of terms from the corpus on a meaning unit-by-meaning unit basis, wherein each term of the plurality is a plurality of words that identify a single concept within the corpus, wherein words in a given one of the meaning units are assigned to only one term; and automatedly generate the ontology from the extracted terms by at least creating two context vectors for each of the plurality of terms and comparing the context vectors for each of the plurality of terms to one another to categorize the terms into a plurality of relations, wherein a first of the two context vectors of a given term is a first list of terms that predicts terms that will appear to the left of the given term, wherein a second of the two context vectors predicts terms is a second list of terms that that will appear to the right of the given term, wherein each of the context vectors includes up to a predetermined number of potential terms in the first or second list of terms taken in descending order based on a calculated score predictive of the likelihood that a specific term will appear adjacent to a given one of the plurality of terms within the meaning units; and an ontology database upon which the processor stores the automatedly generated ontology.

15. The system of claim 14, wherein the communication data comprises transcriptions of interactions, agent scripts, service manuals, and product manuals.

16. The system of claim 14, further comprising:

a script database communicatively connected to the processor; and wherein execution of the computer readable code by the processor further causes the processor to:

surface a plurality of scripts from the communication data;

store the plurality of scripts at the script database; and apply the plurality of scripts from the script database to the corpus of communication data to identify scripts within the corpus of communication data.

17. The method of claim 2, wherein the raw communication data comprises data from the interactions from multiple platforms including interactions made via one or more of by phone, email, internet chat, text message, web page comment, social media interaction, customer surveys, an audio recording, streaming audio, a transcription of spoken content, or written correspondence.

18. The method of claim 17, wherein the rank filter selects data files from the raw communication data that include a threshold of identified related terms to the domain of the ontology that is to be developed.

19. The method of claim 11, wherein the rank filter selects data files from the raw communication data that include a threshold of identified related terms to the domain of the ontology that is to be developed.

20. The method of claim 19, wherein the raw communication data comprises data from the interactions from multiple platforms including interactions made via one or more of by phone, email, internet chat, text message, web page comment, social media interaction, customer surveys, an audio recording, streaming audio, a transcription of spoken content, or written correspondence.

* * * * *